(12) United States Patent
Vishloff et al.

(10) Patent No.: US 7,546,624 B2
(45) Date of Patent: Jun. 9, 2009

(54) SYSTEMS AND METHODS FOR WIRELESS DIGITAL VIDEO MONITORING

(76) Inventors: T. Lee Vishloff, 2345 East Road., Anmore, BC (CA) V3H 5G9; Justin D. Todd, #701 - 933 Hornby Street, Vancouver, BC (CA) V6Z 3G4

( * ) Notice: Subject to any disclaimer, the term of this patent is extended or adjusted under 35 U.S.C. 154(b) by 415 days.

(21) Appl. No.: 11/335,027

(22) Filed: Jan. 18, 2006

(65) Prior Publication Data
US 2007/0169151 A1 Jul. 19, 2007

(51) Int. Cl.
*H04N 7/16* (2006.01)
(52) U.S. Cl. .................. 725/62; 455/404.2; 455/456.1; 455/456.6
(58) Field of Classification Search .................. 725/62; 348/14, 570, 725; 709/219; 455/66.1, 404.2, 455/456.1–456.6
See application file for complete search history.

(56) References Cited

U.S. PATENT DOCUMENTS

| | | | |
|---|---|---|---|
| 2,494,309 | A | 1/1950 | Peterson et al. |
| 4,510,526 | A | 4/1985 | Coutta et al. |
| 5,128,755 | A | 7/1992 | Fancher |
| 5,966,094 | A | 10/1999 | Ward et al. |
| 6,462,775 | B1 | 10/2002 | Loyd et al. |
| 2003/0163826 | A1 | 8/2003 | Weinstein |
| 2004/0024851 | A1* | 2/2004 | Naidoo et al. ............... 709/219 |
| 2006/0205356 | A1* | 9/2006 | Laroia et al. ............... 455/66.1 |

OTHER PUBLICATIONS

"The effects of antenna gains and polarization . . . ", Rappaport, T.S. et al, Vehicular Technology Conference, 1992 IEEE 42nd, May 10-13, 1992, pp. 550-553 vol. 1.
"Impulse response measurements in the UHF & SHF band . . . ", Lacroix, D. et al, Global Telecommunications Conference, 1997, Globecom '97, IEEE, Nov. 3-8, 1997, p. 1584-1588 vol. 3.

* cited by examiner

*Primary Examiner*—Charles N Appiah
*Assistant Examiner*—Michael T Vu
(74) *Attorney, Agent, or Firm*—Oyen, Wiggs, Green & Mutala LLP

(57) ABSTRACT

Portable surveillance and monitoring systems are provided for effecting portable video capture, wireless transmission of video data from one or more portable video capture units (VCUs) to a central monitoring station (CMS) and wireless control of the one or more VCUs from the CMS. One or more portable VCUs are equipped with digital cameras and are located to capture video in a region of interest. Each VCU comprises a plurality of directional antennas, each of which provides antenna gain over a particular azimuthal angular range. Each VCU also comprises a controller which is configured to select a particular one of its antennas and a particular channel identifier (CID) signal and associated frequency hopping sequence which are used to implement frequency hopping spread spectrum wireless communication between the VCU and the CMS. The controller of each VCU may select the best antenna and CID combination on the basis of response time and/or received signal strength of ping operations performed by the VCU controller. The VCUs allow a user to concentrate on pointing the camera at the region of interest (i.e. to capture the video content of interest) without worrying about how the orientation of the VCU will impact communication with the CMS.

46 Claims, 6 Drawing Sheets

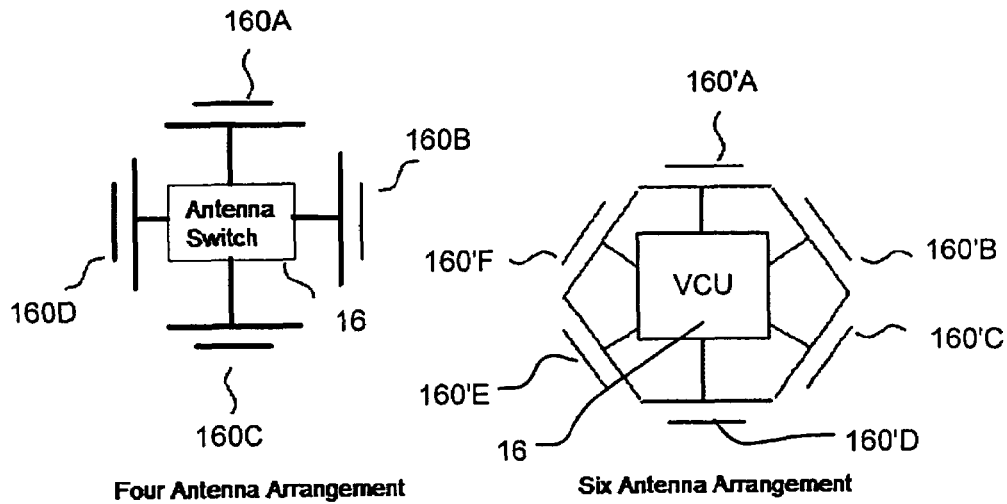
FIGURE 3A — Four Antenna Arrangement
FIGURE 3B — Six Antenna Arrangement
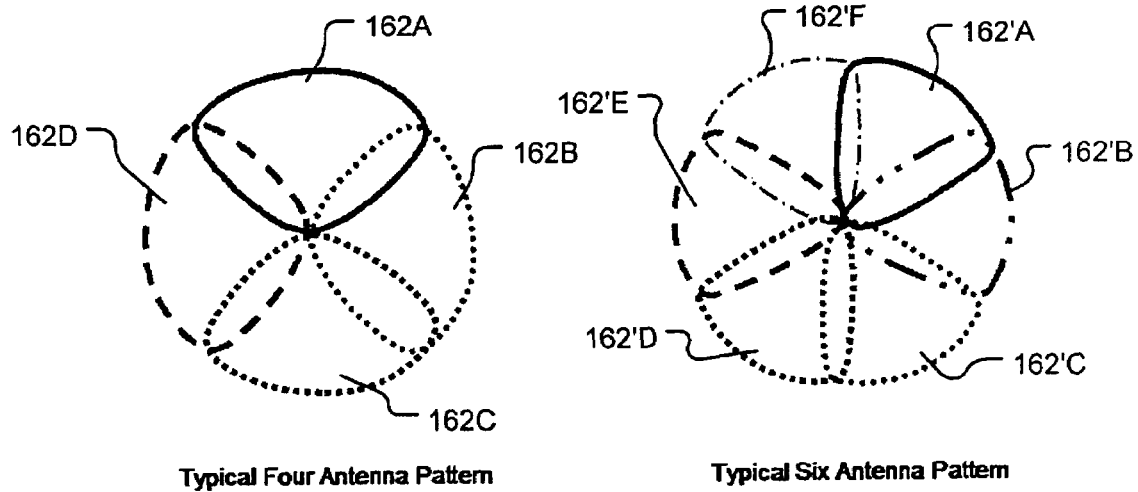
FIGURE 4A — Typical Four Antenna Pattern
FIGURE 4B — Typical Six Antenna Pattern

SYSTEMS AND METHODS FOR WIRELESS DIGITAL VIDEO MONITORING

TECHNICAL FIELD

This invention relates to wireless video surveillance. Particular embodiments of the invention relate to portable wireless video capture units which can be deployed at various locations and controlled from a central location for remote monitoring and/or surveillance.

BACKGROUND

Video surveillance and monitoring systems are widely used to provide visual monitoring of locations and to thereby help detect intrusion, prevent loss or damage to property, provide public safety and the like. There is a general desire to make such surveillance and monitoring systems portable (e.g. for temporary and/or rapid deployment in a variety of environments). Examples of situations having a need for temporary and/or rapid deployment surveillance and monitoring system include emergency situations, such as riots, hostage takings, fires, chemical spills or the like, and special event situations, such as public gatherings, meetings of dignitaries or the like.

Current digital video surveillance and monitoring systems incorporate image capturing device(s) (i.e. camera(s)) which have hardwired connections to AC power and hardwired video transmission connections between the remotely located cameras and a central monitoring location. The hardwired connections to the central monitoring location permits captured video data to be received at the central monitoring location. Such systems are not transportable and are not suitable for applications where it is desired to temporarily and/or rapidly deploy one or more cameras in a variety of environments. There is a need for video surveillance and monitoring systems using wireless camera devices which may be rapidly and/or temporarily deployed to monitor a region of interest.

Digital wireless communication systems incorporating bi-directional point to multipoint digital communications typically incorporate one of two antenna types: omni-directional antennas; and high gain directional antennas. For a given transmission power (which is typically limited by FCC regulations), each of these two antenna types has its own advantages and limitations.

Omni-directional antennas transmit and receive electromagnetic energy in all azimuthal directions and, consequently, there is generally no need to point transmitting and receiving omni-directional antennas toward one another. Omni-directional antennas are generally suitable if the radio path is relatively short and/or the data rate is relatively low. Directional antennas transmit and receive electromagnetic energy preferentially in a particular direction. Examples of directional antennas include patch, panel and Yagi antennas. The ability of a directional antenna to preferentially transmit and receive radiation in a particular direction is referred to as antenna gain. Because of antenna gain, directional antennas are suitable for use over relatively long radio path lengths and/or for relatively high data rates.

Most radio communication systems experience interference from other radio frequency sources, such as other units within the system, foreign radio systems and unintentional radiators, for example. Also, most radio communication systems experience multipath effects. These multipath effects may be due to radio reflections from objects between or close to the communicating radio devices, resulting in signals arriving via different paths and having different time delays. Multipath propagation can result in delay spread, a type of distortion resulting in the spreading out or "smearing" of the received signal and a frequency response that has nulls, which are frequencies where the multiple receive signals add in a destructive manner to reduce the received signal strength. Systems using omni-directional antennas receive energy from all directions at once and therefore tend to experience relatively poor multipath performance when compared to systems using directional antennas.

In order to achieve the advantages of antenna gain (i.e. relatively long radio path length, relatively high data rate and relatively good multipath performance), a directional antenna on a receiving wireless unit must be pointed at the transmitting wireless unit and/or vice versa. The need for pointing directional antennas is inconvenient where it is desired to rapidly and/or temporarily deploy wireless camera devices for video surveillance of a region of interest. In addition, the people deploying such camera devices may not have knowledge of antenna theory or RF transmission and may not comprehend how to properly point a directional antenna.

There is a general desire to provide portable video surveillance and monitoring systems (e.g. for temporary deployment in a variety of environments) which address or ameliorate some of the issues discussed above.

BRIEF DESCRIPTION OF THE DRAWINGS

In drawings which show non-limiting embodiments of the invention:

FIG. 3A is a schematic block diagram of a four antenna arrangement suitable for use with the FIG. 2 video capture unit;

FIG. 3B is a schematic block diagram of a six antenna arrangement suitable for use with the FIG. 2 video capture unit;

FIG. 4A is a diagram showing the radiation pattern of the four antenna arrangement of FIG. 3A;

FIG. 4B is a diagram showing the radiation pattern of the six antenna arrangement of FIG. 3B;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of the invention relate to portable surveillance and monitoring systems (e.g. for rapid and/or temporary deployment in a variety of environments) and provide methods and apparatus for effecting portable video capture, wireless transmission of video data from one or more portable video capture units (VCUs) to a central monitoring station (CMS) and wireless control of the one or more VCUs from the CMS. One or more portable VCUs are equipped with digital cameras and are located to capture video in a region of interest. Each VCU incorporates a plurality of directional antennas, each of which provides antenna gain over a particular azimuthal angular range. Each VCU also incorporates a controller which is configured to select a particular one of its antennas and a particular channel identifier (CD) signal and associated frequency hopping sequence which are used to implement frequency hopping spread spectrum wireless communication between the VCU and the CMS. The controller of each VCU may select the best antenna and CID combination on the basis of response time and/or received signal strength of ping operations performed by the VCU controller. The VCUs allow a user to concentrate on pointing the camera at the region of interest (i.e. to capture the video content of interest) without worrying about how the orientation of the VCU will impact communication with the CMS.

Figure 1:
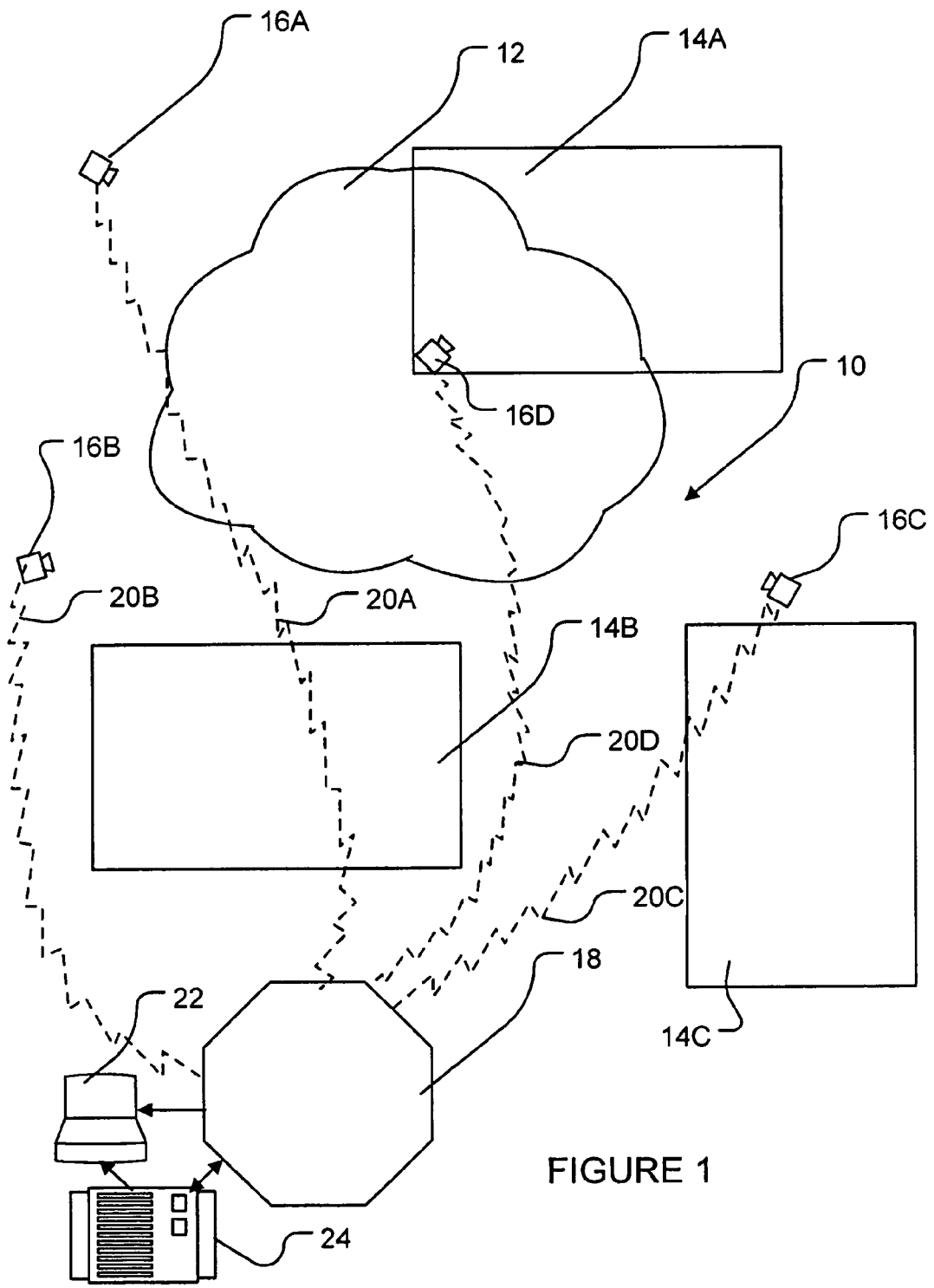
FIG. 1 is a schematic block diagram of a wireless video surveillance system according to a particular embodiment of the invention.

FIG. 1 depicts a surveillance system 10 according to particular embodiment of the invention. System 10 incorporates one or more portable VCUs 16A, 16B, 16C, 16D (collectively, VCUs 16) and a CMS 18. VCUs 16 are battery-powered devices that each have a video camera. VCUs 16 are wireless and relatively light weight, so that they may be rapidly and/or temporarily deployed by locating them around a region of interest 12 and orienting their cameras to capture video content relating to region of interest 12. Preferably, VCU's 16 are relatively small, to further facilitate rapid and/or temporary deployment and, in some applications, to make VCUs 16 relatively discrete. Region of interest 12 may include a number of obstacles, such as building 14A, which prevent any single VCU 16 from being able to capture video from the entire region of interest 12. Region of interest 12 may be partially outdoors and partially indoors. In the illustrated example of FIG. 1, part of the interior of building 14A is located within region of interest 12. In some circumstances (not shown), region of interest 12 may include a plurality of spaced apart sub-regions.

Wireless RF communication links 20A, 20B, 20B, 20D (collectively, communication links 20) are established between VCUs 16 and CMS 18. Wireless links 20 are preferably bi-directional, such that VCU's 16 may be remotely controlled by CMS 18 and/or by a user stationed at CMS 18 and such that digital video data can be transmitted from VCUs 16 to CMS 18. In many applications, it is desirable to locate CMS 18 some distance away from region of interest 12. In such applications, there may not be a direct line of sight between CMS 18 and one or more of VCUs 16. In the illustrated example of FIG. 1, buildings 14B, 14C prevent direct line of sight communications between CMS 18 and some of the VCUs 16.

Figure 2:
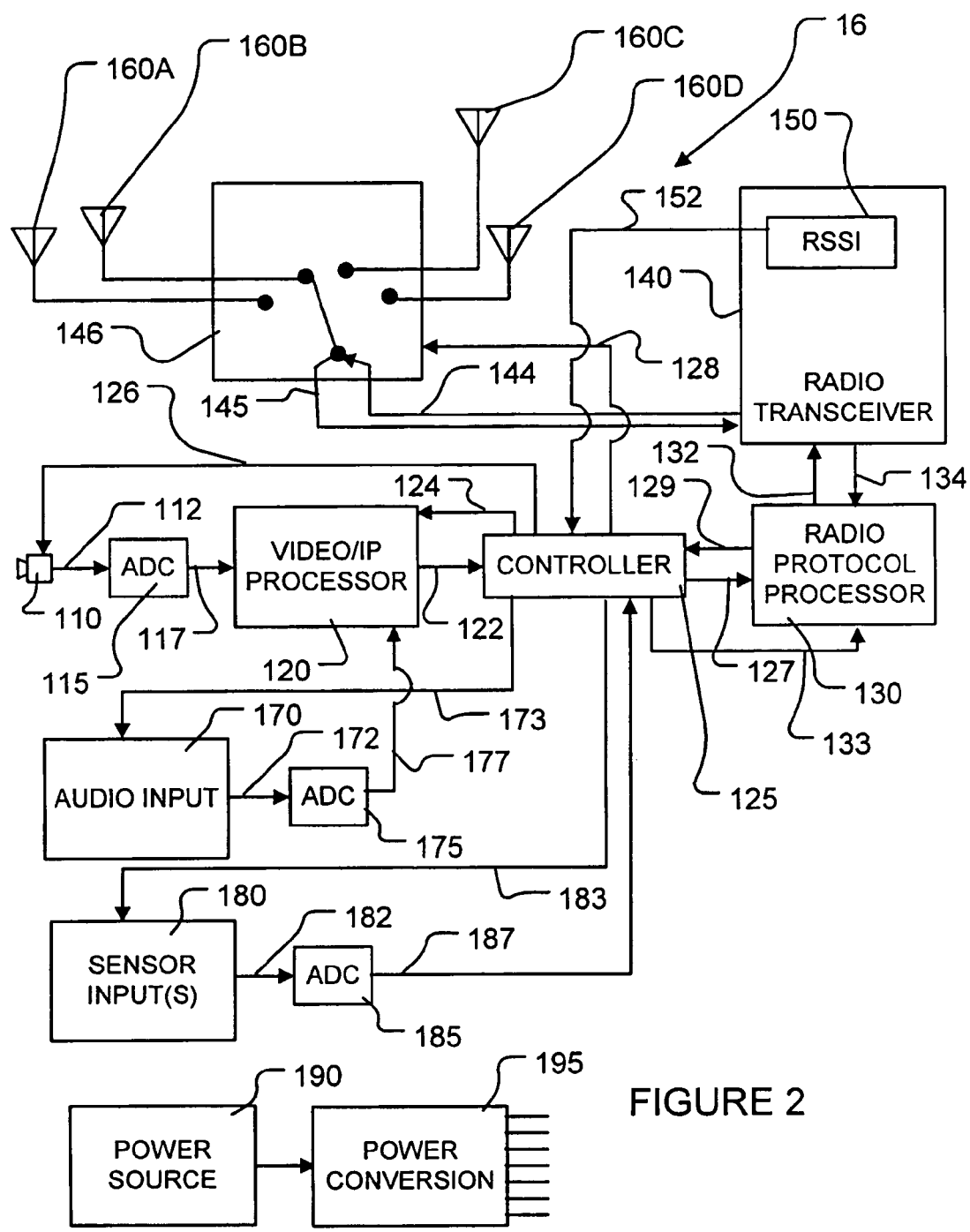
FIG. 2 is a schematic block diagram of a video capture unit suitable for use with the FIG. 1 surveillance system.

FIG. 2 is a schematic depiction of a VCU 16 according to a particular embodiment of the invention. For clarity, some details of VCU 16, such as suitable amplifiers, actuators and other well understood circuit elements are not shown in FIG. 2. VCU 16 has a video camera 110 for capturing video data. VCU 16 also incorporates a plurality of directional antennas 160A, 160B, 160C, 160D (collectively, antennas 160) and an antenna selector 146. In the illustrated embodiment, antenna selector 146 is implemented in the form of a switch. VCU controller 125 is configured to control antenna selector 146 and thereby select a particular one of antennas 160 to effect wireless communication between VCU 16 and CMS 18. Using its selected antenna, VCU 16 wirelessly transmits video data captured by camera 110 (and optionally other sensed data pertaining to region of interest 12) to CMS 18.

Figure 5:
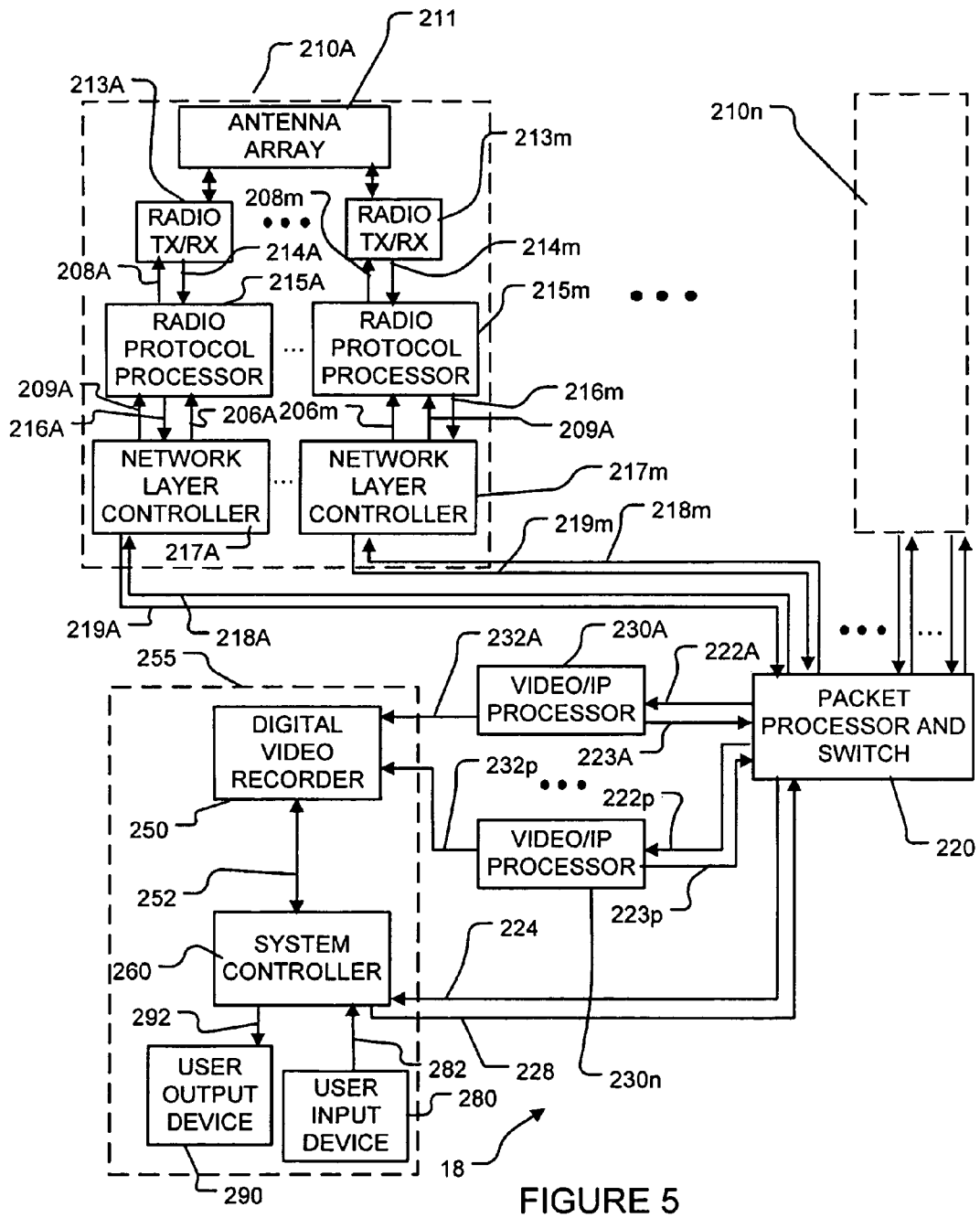
FIG. 5 is a schematic block diagram of a central monitoring station suitable for use with the FIG. 1 surveillance system.

FIG. 5 is a schematic depiction of a CMS 18 according to a particular embodiment of the invention. For clarity, some details of CMS 18, such as suitable amplifiers, actuators and other well understood circuit elements are not shown in FIG. 2. CMS 18 incorporates one or more antenna array units (AAUs) 210A ... 210n (collectively, AAUs 210). AAUs 210 are hardwired to CMS 18, but may be strategically deployed at a distance from CMS 18 in places where they can send and receive wireless communication signals to and from antennas 160 of VCUs 16. Video data captured at VCUs 16 is received by AAUs 210 and is delivered to user interface station 255, where it may be shown on user output device 290 or recorded in digital video recorder 250. Users (not shown) may control various functions of cameras 110 of VCUs 16 by providing camera control commands via user input device 280. Camera control commands may also be generated automatically (i.e. without user input) by system controller 260 or otherwise. These camera control commands are transmitted from CMS 18 to the appropriate VCU 16 to control its camera 110.

Referring to FIG. 2, the components and functionality of VCUs 16 are explained in more detail. Video camera 110 may be a standard commercially available video camera. Non-limiting examples of suitable video cameras include: the Sanyo VCC-ZM400; the Pelco CC1400HZ16-2 and the SONY CCD 420 TVL. Camera 110 outputs an analog video signal 112, which may be an NTSC, PAL or SECAM composite video signal, for example. Camera 110 may alternatively output a plurality of component analog video signals (e.g. in the RGB or YUV video formats). In the illustrated embodiment, analog video output signal 112 from camera 110 is provided to analog to digital converter (ADC) 115, which digitizes analog video output signal 112 and produces digital video signal 117. Video camera 110 may alternatively be a digital video camera which directly produces digital video signal 117, obviating the need for ADC 115.

In the illustrated embodiment, VCU 16 also includes an optional audio input device 170 which generates analog audio signal 172. Audio input device 170 may generally incorporate any suitable audio transducer, such as a microphone, for example. ADC 175 digitizes analog audio signal 172 to produce digital audio signal 177. Audio input device 170 may alternatively be a digital audio input device which directly produces digital audio signal 177, obviating the need for ADC 175. In some embodiments, audio input device 170 (and possibly ADC 175) are part of video camera 110.

Digital video signal 117 and digital audio signal 177 are received by video/IP processor 120, which processes digital video signal 117 and digital audio signal 177 into packets having suitable characteristics for wireless transmission. Video/IP processor 120 may be implemented in software and/or in a combination of hardware and software. In some embodiments, video/IP processor 120 is integrated into controller 125.

Video/IP processor 120 first encodes digital video signal 117 and digital audio signal 177 into a compressed digital bit stream. In currently preferred embodiments, video/IP processor 120 encodes digital video signal 117 and digital audio signal 177 in accordance with the ITU H.263 Video Coding for Low Bit Rate Communication standard (the H.263 standard) or the MPEG-4 ISO/IEC 14496-5:2001 standard (the MPEG-4 standard). After encoding the data, video/IP processor 120 packetizes the compressed digital bitstream into packets for communication over a wireless network. In currently preferred embodiments, video/IP processor 120 packetizes the digital bitstream using the Real Time Protocol (RTP) per IETF RFC 3550 A Transport Protocol for Real-Time Applications. In accordance with this protocol, the output audio/video packets are provided with Internet Protocol (IP) network layer headers. Video/IP processor 120 also introduces video transport control packets to the audio/video packets. Video/IP processor 120 uses these video transport control packets to establish a communication handshaking procedure with a corresponding video/IP processor 230 in CMS 18 (FIG. 5).

The output of video/IP processor 120 is a series of audio/video data packets 122. Audio/video data packets 122 incorporate video data captured by camera 110 in the form of video packets, audio data captured by audio input device 170 in the form of audio packets and video transport control data. Audio/video data packets 122 are provided to controller 125.

VCU 16 may also include one or more additional sensor input(s) 180 which produce one or more corresponding sensor input signal(s) 182. Non-limiting examples of sensor input(s) 180 which may be provided in VCU 16 include: motion sensors, proximity sensors, chemical or biological sensors. ADC 185 digitizes sensor input signal(s) 182 to produce digital sensor signal(s) 187. Digital sensor signal(s) 187 are also provided to controller 125.

Controller 125 may generally incorporate any processor or group of processors capable of providing the functionality described herein and may include, without limitation, embedded microprocessors, dedicated computers, groups of data processors or the like. Preferably, controller 125 is capable of executing program instructions.

Controller 125 receives audio/video data packets 122 from video/IP processor 120 and digital sensor signal(s) 187 from sensor input(s) 180. Controller 125 encodes and packetizes sensor signal(s) 187, providing the resultant sensor data packets with network layer (i.e. IP) headers. Controller 125 may also generate its own system control packets and network level error control packets. Controller 125 controls the communication of all of these packets to CMS 18. Based on the origin of the packets, controller 125 provides network layer buffering and enforces a queuing discipline which ensures that system control packets, network level error control packets, video packets, audio packets, video transport control packets and sensor data packets all receive an appropriate share of the system bandwidth and that delays are maintained within acceptable limits.

In one particular embodiment, controller 125 maintains a number of first in first out (FIFO) buffers (not shown), each having a different priority. Each packet that enters controller 125 or is generated by controller 125 has a packet type determined by the type of service (TOS) bits in its IP header. Controller 125 uses these TOS bits to assign the packet to a corresponding one of the FIFO buffers. System control packets and network level error control packets may be placed in the FIFO buffer having the highest priority, video packets, audio packets and video transport control packets may be placed in an intermediate priority FIFO buffer; and sensor data packets may be placed in a lowest priority FIFO buffer. In some applications, different data types may be understood to be of different relative importance and consequently, the number of priority levels and/or the allocation of data packets to these priority levels may be different. Controller 125 queues the packets in these FIFO buffers until there is available bandwidth to send them to CMS 18 and then releases the packets discretely to radio control processor 130 as part of output signal 127.

In the illustrated embodiment, controller 125 also provides radio control processor 130 with a channel identification (CD) signal 133 (and an associated frequency hopping sequence) for implementing frequency hopping spread spectrum communication with CMS 18. Alternatively, controller 125 may provide the CID to radio control processor 130 as part of output signal 127. The selection of an appropriate CID signal is explained in more detail below.

Radio control processor 130 may be implemented in software or in a combination of hardware and software. In some embodiments, radio control processor 130 is incorporated into controller 125. Radio control processor 130 applies a data link layer header to the packets in output signal 127. This data link layer header provides radio access control and low level error control. One example of a low level error control procedure that may be performed by radio control processor 130 is Automatic Repeat reQuest (ARQ). In particular embodiments, radio control processor 130 performs a selective repeat ARQ procedure. The output of radio control processor 130 is transmission data 132 which is made up of packetized digital data that is ready for transmission over a wireless link.

Radio control processor 130 sends transmission data 132 to radio transceiver 140. Radio transceiver 140 may be a standard radio transceiver as is known in the art and may perform standard transceiver functions such as modulation, demodulation, filtering, amplification, gain control, power control, transmitter keying, frequency control, timing etc. In some embodiments, radio transceiver 140 incorporates radio protocol processor 130. Preferably, radio transceiver 140 provides a digital interface (such as a serial port, a PCMCIA interface or an ethernet interface, for example). Preferably, radio transceiver 140 is capable of operating in one (or more) of the Industrial Scientific and Medical (ISM) bands, but radio transceiver 140 may also operate in other bands. Radio transceiver 140 also preferably incorporates a receive signal strength indicator (RSSI) 150. In some embodiments, radio transceiver 140 is compliant with one or more of the IEEE 802.11 standards, but radio transceiver 140 may also use a non-standardized communication protocol. Radio transceiver 140 is preferably a frequency hopping spread spectrum (FHSS) radio. Non-limiting examples of radios that are suitable for use as radio transceiver 140 include: the Cirronet WIT2411; the Microhard MHX-920; the Symbol LA3021; and the Omnex Controls OEM900.

Radio transceiver 140 outputs a RF data signal 144 to a selected one of antennas 160 via antenna selector 146. RF data signal 144 is transmitted to CMS 18 via the selected one of antennas 160. The operation of antenna selector 146 and the selection of a particular one of antennas 160 are explained in more detail below.

VCU 16 can also receive a RF signal 145 from CMS 18 via its selected antenna 160. As discussed in more detail below, a user is capable of controlling the operation of VCU 16 from user interface station 255 of CMS 18 (FIG. 2). RF signal 145 received from CMS 18 may therefore contain various types of control data for controlling the operation of VCU 16. Such control data may include: system control data, error control data, video transport control data, camera control data, audio sensor control data and control data for sensor(s) 180, for example. RF signal 145 is received on the selected one of antennas 160 propagates through antenna selector 146 and is received by radio transceiver 140. Radio transceiver 140 filters, down-converts and demodulates RF signal 145 (as is known in the art) to produce a baseband, digital received signal 134. Baseband, digital received signal 134 is provided to radio protocol processor 130. In addition to outputting baseband received signal 134, RSSI 150 of radio transceiver 140 may provide an RSSI signal 152 directly to controller 125. RSSI signal 152 indicates the strength of RF signal 145 received by radio transceiver 140.

Baseband received signal 134 is packetized and incorporates various control packets which may include: system control packets, error control packets, video transport control packets, camera control packets, audio sensor control packets and control packets for sensor(s) 180, for example. Radio control processor 130 performs low level error checking (e.g. ARQ processing) on baseband received signal 134 and strips the data link layer header and reassembles the packets before sending the packets to controller 125 as control input signal 129.

Controller 125 receives the packets in control input signal 129. Controller 125 strips the IP headers from the packets in control input signal 129 and uses Transmission Control Protocol (TCP) port numbers (i.e. information in the transport layer header) to route the incoming control data appropriately. Controller 125 may route the data to one of its internal software processes or to an external destination. For example, video transport control data, which relates to the handshaking procedure between video/IP processor 120 and a corresponding video/IP processor 230 in CMS 18, may be routed to video/IP processor 120. Controller 125 may route the data in system control packets and error control packets to one of its internal software processes for processing within controller 125.

CMS 18 allows a user to control certain functions of camera 110 from its user interface station 255. In currently preferred embodiments, a user is able to control the zoom, focus, pan and tilt of camera 110. The camera control signals created at CMS 18 are received at controller 125 as camera control packets. Controller 125 identifies camera control data (on the basis of the TCP port number) and routes the camera control data in an appropriate manner. On the basis of this camera control data, controller 125 sends one or more camera control signal(s) 126 to camera 110 or to suitable amplifiers and/or actuators (not shown) which effect the pan, tilt, focus and zoom operations of camera 110. In some embodiments, camera control data is routed to an internal software process running on controller 125, which processes the camera control data internally and uses camera control signal(s) 126 to effect controlled or open loop pan, tilt, zoom and/or focus of camera 110. In other embodiments, controller 125 routes the camera control data to one or more external hardware motor controller components (not shown), which in turn provide camera control signal(s) 126 for controlling the pan, tilt, focus and zoom operations. In still other embodiments, controller 125 strips the IP header from the incoming camera control packets and routes the camera control data directly to camera 110 as camera control signal(s) 126. In these embodiments, camera 110 incorporates its own amplifiers and actuators for effecting the pan, tilt, zoom and/or focus control.

Controller 125 may also receive packets containing audio sensor control data (i.e. for controlling audio sensor input 170) and packets containing control data relating to other sensor input(s) 180. For example, a user at user interface station 255 of CMS 18 may want to increase the sensitivity of audio sensor 170 or of other sensor input(s) 180 or to trigger one or these sensors from an inactive state to an active state. This control data my be routed to an appropriate software processes operating on controller 125 which may process this control data in a manner similar to that of the camera control data and may send corresponding control signal(s) 173 to audio input sensor 170 and/or corresponding control signal(s) 183 to other sensor input(s) 180 to effect the desired control operation. This audio sensor control data and/or control data relating to other sensor input(s) 180 may be handled using techniques similar to any of the alternative techniques discussed above in connection with the camera control data.

Referring now to FIG. 5, CMS 18 incorporates one or more antenna array units (AAUs) 210. Each AAU 210 has an antenna array 211 which includes a suitable plurality of directional antennas (not specifically shown). In the illustrated embodiment, antenna array 211 incorporates m antennas and each antenna in array 211 is connected for bidirectional communication with a corresponding radio transceiver 213A . . . 213m (collectively, radio transceivers 213). Radio transceivers 213 may be substantially similar to, and perform substantially the same functions as, radio transceiver 140 of VCU 16 (FIG. 2).

In the illustrated embodiment, each radio transceiver 140 is connected for two way communication with a corresponding radio protocol processor 215A . . . 215m (collectively, radio control processors 215). Radio protocol processors 215 are analogous to, and perform the substantially same functions as, radio control processor 130 of VCU 16. More particularly, radio control processors 215 receive incoming data packets 214A . . . 214m (collectively, incoming data packets 214) from transceivers 213 and process incoming data packets 214 at the link layer to produce incoming IP data packets 216A . . . 216m (collectively, incoming IP data packets 216) which are sent to corresponding network layer controllers 217A . . . 217m (collectively, network later controllers 217). Radio control processors 215 also receive outgoing IP data packets 209A . . . 209m (collectively, outgoing IP data packets 209) from network layer controllers 217 and process outgoing IP data packets 209 at the data link layer to produce outgoing data 208A . . . 208m (collectively, outgoing data 208) which is sent to transceivers 213 and subsequently transmitted to VCUs 16.

Network layer controllers 217 perform IP packet forwarding functions and network address translation (NAT) at the network layer as required between the components of VCUs 16 and the components of CMS 18. For incoming IP data packets 216 received from radio protocol controllers 215, network layer controllers 217 deconstruct the incoming IP packets 216 and provide reassembled incoming IP packets 219A . . . 219m (collectively, incoming IP packets 219) with new IP headers having translated address and port information local to CMS 18. Incoming IP packets 219 are provided to packet processor 220. Network layer controllers 217 also receive outgoing IP data packets 218A . . . 218m (collectively, outgoing IP packets 218) from packet processor 220. The IP headers of outgoing IP packets have address and port information that is local to CMS 18. Network layer controllers 217 deconstruct the IP headers of outgoing IP packets 218 and provide reassembled outgoing IP packets 209 having address and port information relating to a destination VCU 16.

CMS 18 also incorporates a user interface station 255 which includes digital video recorder 250, user input device 280, user output device 290 and system controller 260. In some embodiments, user interface station 255 may be provided by a personal or laptop computer system. System controller 260 may generally incorporate any processor or group of processors capable of providing the functionality described herein and may include, without limitation, embedded microprocessors, dedicated computers, groups of data processors or the like. Preferably, system controller 260 is capable of executing program instructions.

System controller 260 uses user input device 280 and user output device 290 to provide a suitable user interface for the operation of surveillance system 10 (FIG. 1). System controller 260 outputs signals 292 to user output device 290. User output device 290 preferably incorporates a video display (e.g. a CRT or a flat screen video display) and may also incorporate any other suitable user output devices. Output signals 292 may contain information about region of interest 12 (FIG. 1) which is obtained from VCUs 16. This information may be displayed or otherwise outputted on user output device 290. Accordingly, users can monitor region of interest 12 by monitoring user output device 290. Users may also control the operation of VCUs 16 by using user input device 280 to provide control input information 282 to system controller 260. User input device 280 may be provided by a keyboard, a mouse, a series of input buttons, switches and/or joysticks or any other suitable input device.

As discussed above, CMS 18 and VCUs 16 preferably communicate with one another using frequency hopping spread spectrum communication. To effect this frequency hopping, system controller 260 assigns a channel identification (CID) and a corresponding frequency hopping sequence to each radio protocol processor 215 and/or to each network layer controller 217 (i.e. to each "radio channel") in CMS 18. Radio protocol processors 215 use this CID to effect frequency hopping on their corresponding transceivers 213. System controller 260 may assign a CID to a radio channel using one or more CID control packets that are provided on control signal 228. System controller 260 sends CID control packets to a particular radio channel by addressing a network layer controller 217 corresponding to the radio channel (i.e. in the IP header of the CID control packets).

Packet processor 220 routes the CID control packets (based on their IP header) to an appropriate one of network layer controllers 217 as a part of signal 218A. Network layer controllers 217 may use the TCP port number to identify CID control packets and to provide the appropriate CID information to their corresponding radio protocol processors 215 via signals 206A ... 206m (collectively, CID signals 206) or via signals 209. As discussed further below, each VCU 16 is configured to select a particular CID for optimum performance.

When CMS 18 receives data over a wireless link from one of VCUs 16, the data is received and processed by one of AAUs 210 and is provided to packet processor 220 in the form of IP packets 219 having IP headers local to CMS 18. Packet processor 220 performs network layer routing functions on the incoming IP packets 219. More particularly, packet processor 220 uses the IP headers to determine the intended destination of incoming IP packets 219 and directs the appropriate packets to the appropriate IP addressable components of CMS 18. As discussed above, each VCU 16 can transmit: system control packets, network level error control packets, video packets, audio packets, video transport control packets and sensor data packets. Packet processor 220 may direct system control packets and network level error control packets to system controller 260 via signal 224. System controller 260 interprets the system control information and error control information received in signal 224 and takes appropriate action if necessary.

Packet processor 220 may also route sensor data packets (i.e. packets containing information captured by sensors input(s) 180 (FIG. 2)) to system controller 260 via signal 224. System controller 260 may interpret this sensor data and use output signal 292 to display appropriate information on user output device 290. In some circumstances, this sensor data may trigger a response from system controller 260. By way of non-limiting example, sensor input 180 may be a motion sensor. When motion is detected in region of interest 12, it is detected by sensor input 180 and transmitted from VCU 16 to CMS 18. When system controller 260 receives this motion detection information, system controller 260 may use output signal 292 to create an alarm signal (e.g. a flashing LED) on user output device 290. Additionally or alternatively, system controller 260 may generate a system control signal 228 in response to receipt of the motion detection information. System control signal 228 may be transmitted back to VCU 16 and may cause VCU 16 to take some action, such as turning on its camera 110 or causing its camera 110 to zoom in, for example.

CMS 18 incorporates a plurality of video/IP processors 230A ... 230p (collectively, video/IP processors 230). In the illustrated embodiment, video/IP processors 230 are IP addressable components. Packet processor 220 analyzes the IP headers of video packets, audio packets and video transport control packets received from AAUs 210 (as a part of signals 219), determines which of video/IP processors 230 the packet is destined for and routes video packets, audio packets and video transport control packets to an appropriate one of video/IP processors 230 using a corresponding one of audio/video signals 222A ... 222p (collectively, audio/video signals 222). In the illustrated embodiment, CMS 18 assigns one video/IP processor 230 to each VCU 16 in surveillance system 10. Video/IP processors 230 in CMS 18 that have been assigned to a particular VCU 16 communicate with video/IP processor 120 on their corresponding VCU 16 to manage the transport of audio/video data from their corresponding VCU 16. In alternative embodiments, video/IP processors 230 of CMS 18 handle audio/video communications with more than one VCU 16.

As is the case with VCU 16, video/IP processors 230 may be implemented in software or a combination of software and hardware. In some embodiments, video/IP processors 230 may be incorporated in system controller 260. In such embodiments, video/IP processors 230 may be addressed using some technique other than IP headers, such as TCP port numbers for example.

As discussed above, in currently preferred embodiments, the transport of audio/video data is handled by CMS side video/IP processors 230 and their corresponding VCU side video/IP processors 120 in accordance with the Real Time Protocol (RTP) per IETF RFC 3550 A Transport Protocol for Real-Time Applications. CMS side video/IP processors 230 make use of video transport control packets which are transmitted to their corresponding VCU side video/IP processors 120 to effect the handshaking procedure with their corresponding VCU side video/IP processors 120. CMS side video/IP processors 230 output video transport control packets 223A ... 223p (collectively, video transport control packets 223) which are provided to packet processor 220. The transmission of video transport control packets 223 to corresponding VCUs 16 is explained in more detail below.

Each video/IP processor 230 interprets the audio/video data packets that it receives and provides the audio/video packets to user interface station 255 via audio/video signals 232A ... 232p (collectively, audio/video signals 232). Audio/video signals 232 are preferably encoded in the MPEG-4 or H.236 video standards, as discussed above. In other embodiments, audio/video signals 232 may be converted back to some analog standard, such as NTSC, PAL or SECAM composite video signal, for example. Audio/video signals 232 are supplied to digital video recorder 250 which records the audio/video information contained in audio/visual signals 232 in digital format. In cases where audio/video signals 232 are provided in analog format, digital video recorder 250 may include a video capture card or the like. System controller 260 can access the audio/visual information recorded in video recorder 250 to obtain audio/video signal 252 which system controller 260 can output on user output device 290 via signal 292. Preferably, if desired, system controller 260 can output the audio/visual information via user output device 290 at substantially the same time as it is recorded by digital video recorder 250. In this manner, a user can monitor region of interest 12 using the camera 110 from any one or more of VCUs 16.

As discussed above, a user may also input control information 282 via user input device 280. Such control information 282 is provided to system controller 260 which interprets control information 282 and determines whether control information 282 needs to be transmitted to one or more VCUs 16. Non-limiting examples of control information 282 that is transmitted to VCUs 16 includes: zoom, pan, tilt and focus control commands for camera 110 on a particular VCU 16; control commands for audio sensor input 170 on a particular VCU 16 and control commands for one of the other sensor input(s) 180 on a particular VCU 16.

If it is necessary to transmit control information 282 to one or more VCUs 16, system controller 260 packetizes the data in control information 282 (i.e. by adding network level (i.e. IP) headers which address particular network layer controllers 217) and sends an appropriate packetized control signal 228 to packet processor 220. System controller 260 may also generate its own system control packets and network level error control packets for transmission to one or more VCUs 16. These system control packets and network level control packets may also incorporate IP headers that address network layer controllers 217 and may form part of signal 228 that is sent from system controller 260 to packet processor 220.

Packet processor 220 receives system control packets, network level error control packets and packetized control data (e.g. camera control packets, audio sensor control packets and control packets for other sensor input(s) 180) from system controller 260 as a part of signal 228. As discussed above, packet processor 220 also receives outgoing video transport control packets 223 from video/IP processors 230. Packet processor 220 controls the communication of all of these control signal packets from CMS 18 to the appropriate VCUs 16.

As discussed further below, each VCU 16 selects a CID for frequency hopping wireless communication with CMS 18. The CID selected by each VCU 16 corresponds to the CID assigned to one of the radio channels of CMS 18 (i.e. to one of protocol processors 215 and/or a corresponding one of network layer controllers 217). Accordingly, to communicate with a particular VCU 16, the IP packets received at packet processor 220 preferably have IP headers which address one of network layer controllers 217 corresponding to a CMS radio channel which uses the same CID as the desired VCU 16. Thus, packet processor 220 routes the control packets in signal 228 (received from system controller 260) and the outgoing video transport control packets 223 (from video/IP processors 230) to appropriate network layer controllers 217. Packets received at a particular network layer controller 217 are transmitted via wireless link to a particular VCU 16 which uses the same CID as the particular network layer controller 217.

VCUs 16 are each provided with a plurality of directional antennas 160 and a particular one of these antennas 160 is selected for communication with CMS 18. This allows a user to quickly deploy a VCUs 16 by pointing their cameras 110 at region of interest 12 (i.e. to capture the video content of interest) without worrying about how the orientation of VCUs 16 will impact communication with CMS 18. Control of antenna selector 146 is effected by controller 125. More particularly, controller 125 outputs a switch selection signal 128 which causes antenna selector 146 to select a particular one of antennas 160 for transmission of data to (and reception of data from) CMS 18. The method and criteria used by controller 125 for selecting a particular one of antennas 160 are explained in more detail below.

In the illustrated embodiment of FIG. 2, VCU 16 has four directional antennas 160. FIG. 3A is a schematic diagram of a four antenna arrangement suitable for use with VCU 16 of FIG. 2. As shown in FIG. 3A, directional antennas 160 are oriented generally symmetrically about an azimuthal axis and are generally equally angularly spaced apart from one another. FIG. 4A is a schematic diagram showing the radiation patterns 162A, 162B, 162C, 162D (collectively, radiation patterns 162) of directional antennas 160 oriented as shown in FIG. 3A. Radiation patterns 162 are generally indicative of the amount of antenna gain of directional antennas 160 in a particular direction. The overlapping radiation patterns 162 of FIG. 4A indicate that directional antennas 160 each exhibit some degree of antenna gain over an azimuthal angular range greater than 90°.

VCU 16 may generally incorporate any suitable number of directional antennas 160. FIG. 3B illustrates an alternative embodiment, wherein VCU 16 has six directional antennas 160'A-160'F (collectively, antennas 160') which are generally symmetrically oriented about their azimuthal axis and are generally equally angularly spaced apart from one another. FIG. 4B is a schematic diagram showing the radiation patterns 162'A-162'F (collectively, radiation patterns 162') of directional antennas 160' oriented as shown in FIG. 3B. The overlapping radiation patterns 162' of FIG. 4B indicate that directional antennas 160' each exhibit some degree of antenna gain over an azimuthal angular range of greater than 60°.

In general, VCU 16 may incorporate any suitable number of antennas. The antennas may be symmetrically oriented about an azimuthal axis and each of the antennas may exhibit antenna gain over an angular range greater than or equal to 360°/n, where n is the number of antennas. In some embodiments, adjacent radiation patterns 162 overlap one another before their corresponding antenna gains drop by more than 3 dB from their peak levels. In such embodiments, it may be said that antennas 160 have a "sector beamwidth" of greater than or equal to 360°/n. However, this sector beamwidth characteristic is not a requirement.

Providing a relatively large number of antennas has the ability to increase the advantages associated with antenna gain, namely relatively long radio path length, relatively high data rate and relatively good multipath performance. However, providing a relatively large number of antennas tends to increase the cost of each VCU 16 and also increases the size and weight of each VCU 16, thereby making VCUs 16 less portable. Those skilled in the art will appreciate that the number of antennas 160 provided in each VCU 16 may be tailored to the particular application of interest. For example, if a particular application requires that CMS 18 is located a long distance away from region of interest 12, then it may be advantageous to provide a large number of antennas 160 each having a large amount of antenna gain to improve the communication range between VCUs 16 and CMS 18. Conversely, if an application requires that a VCU be discretely deployed in a matter of seconds, then it may be advantageous to provide a VCU having a smaller number of antennas and which is correspondingly easier to deploy.

Figure 6:
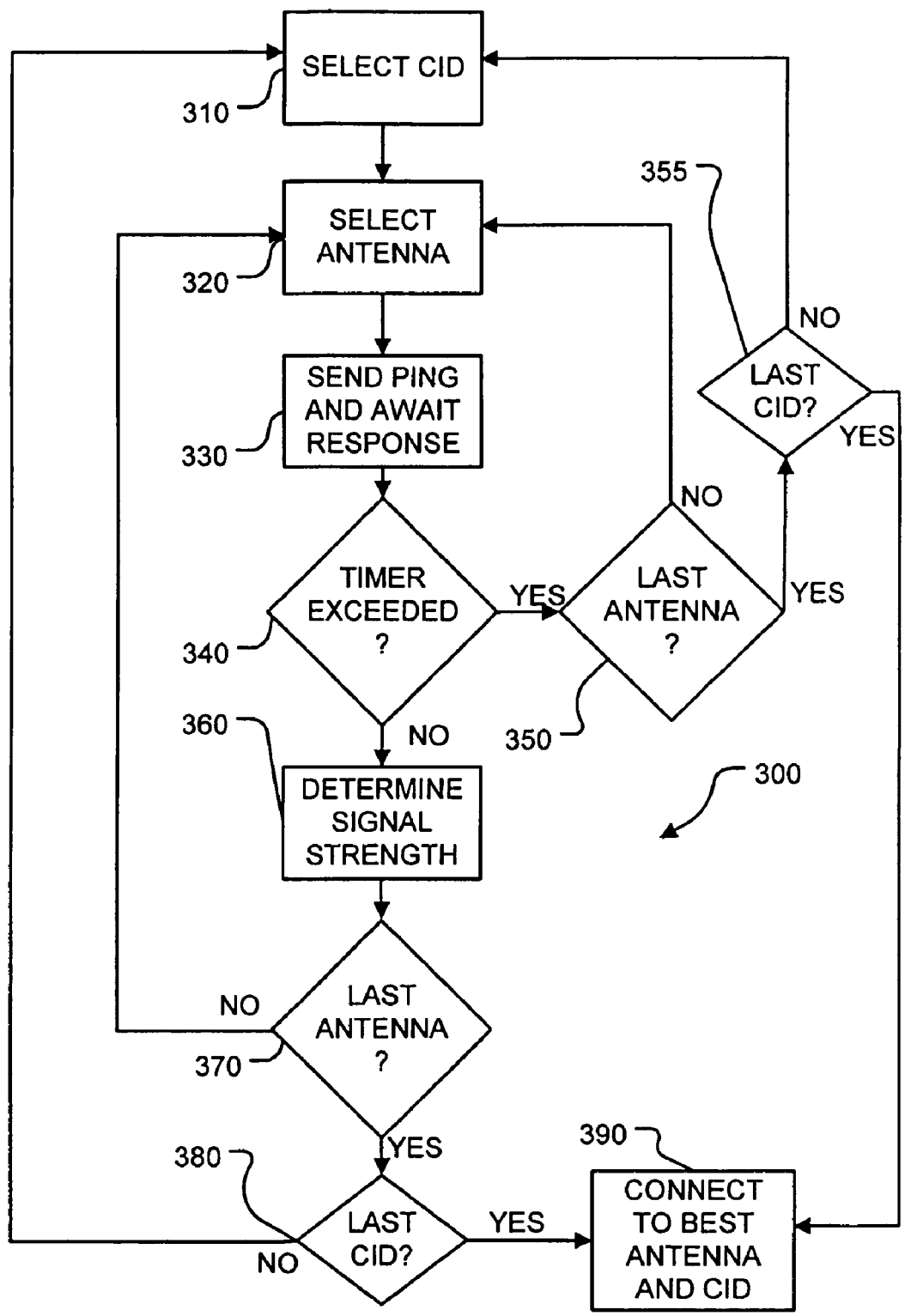
FIG. 6 is a schematic flow chart illustrating a method for selecting an antenna and a frequency hopping channel identification for wireless communication between the FIG. 2 video capture unit and the FIG. 5 central monitoring station in accordance with a particular embodiment of the invention.

FIG. 6 schematically depicts a method 300 used by VCU 16 to configure antenna selector 146 and to thereby select a particular one of its antennas 160 in accordance with a particular embodiment of the invention. In addition to selecting an antenna, method 300 may be used by VCU 16 to select a CID (and a corresponding frequency hopping sequence) with which to communicate with CMS 18. As discussed above, each "radio channel" in CMS 18 is assigned a particular CID. Once antenna selector 146 is configured (i.e. one of antennas 160 is selected) and a CID is selected, VCU 16 can communicate with CMS 16 over a corresponding one of wireless links 20 (FIG. 1). In some embodiments, antenna/CID selection process 300 is effected by controller 125 of VCU 16 (FIG. 2).

Typically, although not necessarily, antenna/CD selection process 300 is initiated in response to one or more of the following conditions:
  (i) an initial "power ON" condition;
  (ii) an error recovery condition, where a radio channel has been lost. Such a condition may occur for numerous reasons, such as VCU 16 being moved, the path between VCU 16 and CMS 18 becoming obstructed by a large object or the occurrence of some other propagation and/or interference effect, for example; and
  (iii) a fault recovery scenario due to an incident with some other hardware or software in VCU 16 and/or CMS 18.

Antenna/CID selection process 300 begins in block 310, where controller 125 selects a CID (and an associated hop sequence). Controller 125 of VCU 16 is provided with a list of permiitted CIDs (corresponding to the CDs assigned to the radio channels of CMS 18). In block 310, controller 125 selects one of the CID signal possibilities from its list and provides the selected CID to radio control processor 130. In some embodiments, controller 125 communicates the selected CID to radio control processor 130 via signal 133. Alternatively, controller 125 may communicate the selected CID to radio control processor as a part of signal 127.

In some embodiments, controller 125 maintains a historical list of the CIDs which have been successfully used by its corresponding VCU 16 and controller 125 commences the block 310 CID selection process by selecting the last successfully used CID as a starting CID. However, neither this starting CID selection nor the maintenance of a historical CID list are necessary. In alternative embodiments, controller 125 may maintain a static CID list and may implement a quasi-random procedure to select the starting CID. Once wireless communication is established between VCU 16 and CMS 18, the CID list (and associated hop sequences) maintained by controller 125 may be updated from CMS 18 in response to user input or otherwise.

In block 320, controller 125 communicates with antenna selector 146 (via signal 128) to select a first one of antennas 160A, 160B, 160C, 160D. In some embodiments, controller 125 maintains a historical list of the antennas which have been successfully used by its corresponding VCU 16 and controller 125 commences the block 320 antenna selection process by selecting the last successfully used antenna 160 as a starting antenna. However, neither the maintenance of a historical list nor the starting antenna selection are necessary and controller 125 may start with any one of antennas 160.

Method 300 then proceeds to block 330, where controller 125 attempts to perform one or one or more ping operations by sending one or more ping packets to CMS 18. Controller 125 may send such ping packets in the same manner as it sends system control packets. Ping operations are well known in the art of IP networking. Ping operations are implemented using the Internet Control Message Protocol (ICMP) echo function, where a ping packet is sent from a first network device (e.g. VCU 16) to a destination network device (e.g. CMS 18) and, if the network is operating properly, a single packet is received in reply. A ping operation may also collect performance statistics (e.g. the measured round trip time and the number of times the destination network device fails to reply).

If communication occurs between VCU 16 and CMS 18 on the currently selected combination of CID and antenna, then the block 330 ping packet(s) sent by controller 125 are received at CMS 18 by network layer controller 217 (FIG. 5). Upon receipt of a ping packet from VCU 16, network layer controller 217 sends a reply packet which is received by VCU 16 and directed to controller 125. Controller 125 may record the round trip time of the block 330 ping packet(s) and may associate this response time with the currently selected CID and antenna pair. It will be appreciated by those skilled in the art that because of error control processing implemented at the data link layer (e.g. the ARQ processing discussed above), if ping packet(s) sent by VCU 16 to CMS 18 (or vice versa) encounter problems, then another attempt will be made to communicate these ping packet(s), but the response time measured by the ping operation will be significantly longer.

In block 340, controller 125 evaluates the response time (i.e. round trip time) of the block 330 ping packet(s). If the response time of the block 330 ping packet(s) is greater than a certain temporal threshold (block 340 YES output), then the currently selected combination of CID and antenna is not a potential candidate for overall selection by method 300. Method 300 then proceeds to block 350, where controller 125 queries whether the current antenna is the last antenna in its list. If, in the block 350 inquiry, controller 125 determines that the current antenna is not the last antenna in its list (block 350 NO output), then method 300 loops back to block 320, where controller 125 selects a new antenna from its list and repeats the testing procedure of blocks 330 through 360 with the same CID and the newly selected antenna.

If, in the block 350 inquiry, controller 125 determines that the current antenna is the last antenna (block 350 YES output), then method proceeds to block 355, where controller 125 queries whether the current CID is the last CID in its list. If, in the block 355 inquiry, controller 125 determines that the current CID is not the last CID in its list (block 355 NO output), then method 300 loops back to block 310, where controller 125 selects a new CID from its list and the testing procedure of blocks 320 through 360 is repeated for the newly selected CID. If, in the block 355 inquiry, controller 125 determines that the current CID is the last CID in its list (block 355 YES output), then method proceeds to block 390.

If the response time of the block 330 ping packet(s) is less than a certain temporal threshold (block 340 NO output), then the currently selected CID and antenna pair is a potential candidate for overall selection by method 300. Method 300 then proceeds to block 360, where controller 125 obtains a RRSI signal 152 from RSSI 150 indicating the strength of the signal received at radio transceiver 140. Controller 125 may record the block 360 RSSI information and may associate this RSSI information with the currently selected combination of CID and antenna.

After determining the received signal strength (RSSI) for the currently selected CID and antenna pair in block 360, method 300 proceeds to block 370, where controller 125 queries whether the current antenna is the last antenna in its list. If, in the block 370 inquiry, controller 125 determines that the current antenna is not the last antenna in its list (block 370 NO output), then method 300 loops back to block 320, where controller 125 selects a new antenna from its list and the testing procedure of blocks 330 through 360 is repeated with the same CID and the newly selected antenna.

If, in the block 370 inquiry, controller 125 determines that the current antenna is the last antenna in its list (block 370

YES output), then method proceeds to block 380, where controller 125 queries whether the current CID is the last CID in its list. If, in the block 380 inquiry, controller 125 determines that the current CID is not the last CID in its list (block 380 NO output), then method 300 loops back to block 310, where controller 125 selects a new CID from its list and the testing procedure of blocks 320 through 370 is repeated for the new CID. If, in the block 380 inquiry, controller 125 determines that the current CID is the last CID in its list (block 380 YES output), then method proceeds to block 390.

Figure 7:
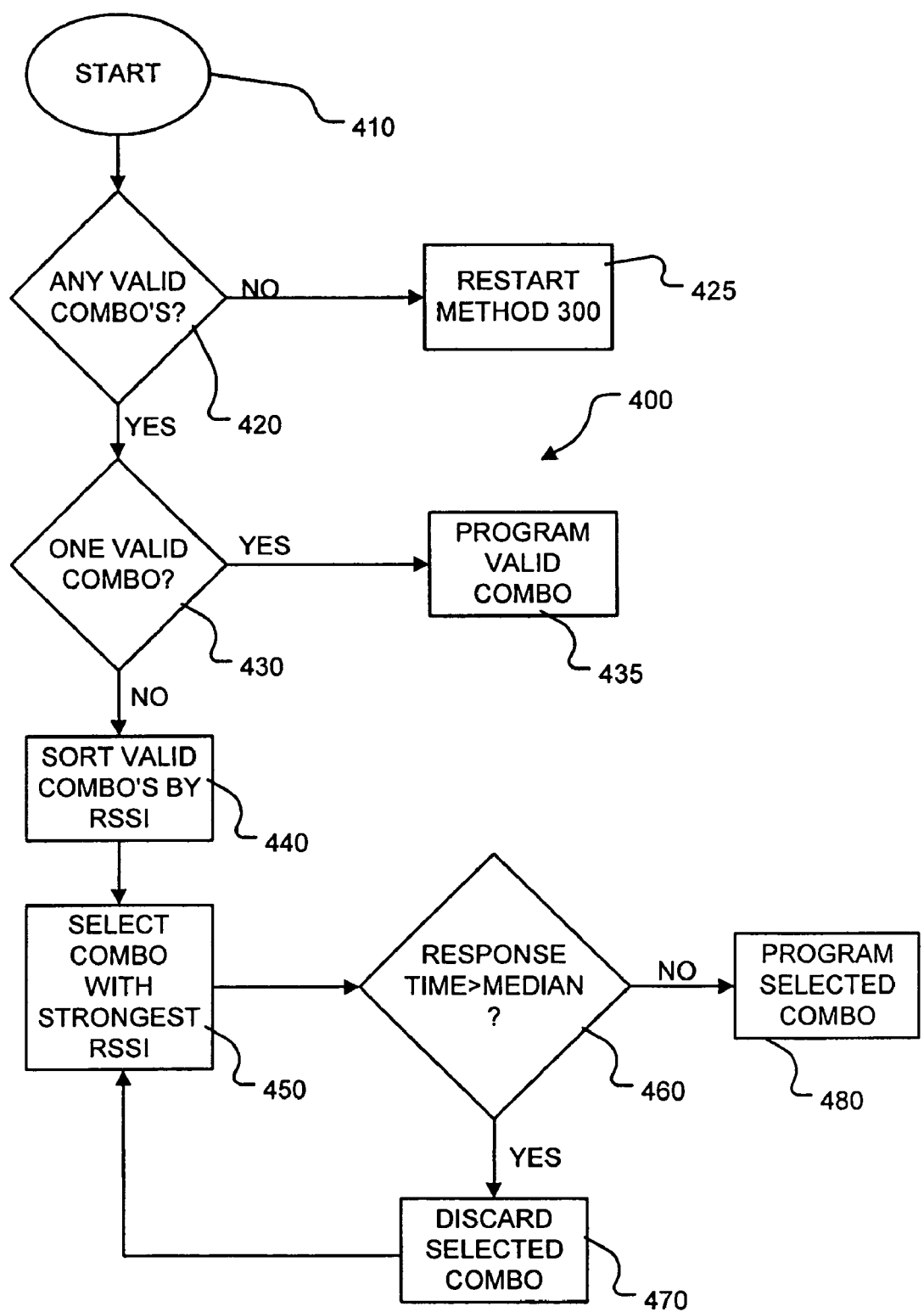
FIG. 7 is a schematic flow chart illustrating a method for selecting the best combination of antenna and frequency hopping channel identification that is suitable for use with the method of FIG. 6.

When method 300 reaches block 390, controller 125 has evaluated all of the CID and antenna combinations in its list of CIDs and its list of antennas. In block 390, controller 125 selects a preferred combination of CID and antenna. FIG. 7 illustrates a method 400 for selecting a preferred combination of CID and antenna in accordance with a particular embodiment of the invention. Method 400 may be used in block 390 of method 300. Method 400 commences in block 410 and then proceeds directly to the inquiry of block 420. Block 420 involves an inquiry as to whether method 300 (FIG. 6) located any valid combinations of CID and antenna (i.e. combinations of CID and antenna for which method 300 reached block 360). If there are no valid CID and antenna combinations (block 420 NO output), then method 400 proceeds to block 425, where controller 125 causes method 300 to be repeated.

If there are one or more valid CID and antenna combinations (block 420 YES output), then method 400 proceeds to the inquiry of block 430. If, in block 430, controller 125 determines that there is only one valid combination of CID and antenna (block 430 YES output), then controller 125 chooses the one valid combination of CID and antenna in block 435 as the preferred combination of CID and antenna. Controller 125 programs radio control processor 130 with the CID chosen in block 435 and causes antenna selector 146 to select the antenna chosen in block 435. VCU 16 then uses this combination of CID and antenna for subsequent communication with CMS 18.

If controller 125 determines that there is more than one valid combination of CID and antenna (block 430 NO output), then controller 125 proceeds to block 440, where it sorts the list of valid CID and antenna combinations in decreasing order of their RSSI (i.e. the received signal strength measured in block 360 (FIG. 6)). Method 400 then proceeds to block 450, where controller 125 selects the combination of CID and antenna with the highest RSSI to be the currently selected combination of CID and antenna.

In block 460, controller 125 compares the ping response time of the currently selected CID and antenna pair to the median ping response time of the valid CID and antenna pairs in its list. If the ping response time of the currently selected CID and antenna pair is less than the median ping response time (block 460 NO output), then method 400 proceeds to block 480, where controller 125 chooses the currently selected combination of CID and antenna as the preferred combination of CID and antenna. Controller 125 programs radio control processor 130 with the CID chosen in block 480 and causes antenna selector 146 to select the antenna chosen in block 480. VCU 16 then uses this combination of CID and antenna for subsequent communication with CMS 18.

If, in block 460, controller 125 determines that the ping response time of the currently selected CID and antenna pair is greater than the median ping response time of the valid CID and antenna pairs (block 460 YES output), then the currently selected CID and antenna pair is discarded in block 470. Method 400 then returns to block 450, where controller 125 selects the CID and antenna pair with the next highest RSSI from its sorted list of valid CID and antenna pairs to be the currently selected pair. In this manner, the block 460 inquiry is repeated until a selected CID and antenna pair has a ping response time that is less than the median ping response time and controller 125 chooses this CID and antenna pair as the preferred combination of CID and antenna in block 480.

Certain implementations of the invention comprise computer processors which execute software instructions which cause the processors to perform a method of the invention. For example, one or more processors in a dual modulation display system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including C/D ROMs, DVDs, electronic data storage media including ROMs, flash RAM, or the like or transmission-type media such as digital or analog communication links. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- AAUs 210 may have other architectures. For example, antennas in array 211 may share radio transceivers 213, radio transceivers 213 may share radio control processors 215 and/or radio control processors 215 may share network layer controllers 217.
- The components illustrated in the schematic block diagrams of VCU 16 and CMS 18 need not be implemented exactly as shown. Those skilled in the art will appreciate that various combinations of the components shown in these schematic diagrams may be implemented by a single processor or the like, configured with the proper program instructions. For example, in some embodiments, video/IP processors 230 of CMS 18 may be implemented by a single processor configured with the proper software instructions. As another example, in some embodiments, radio protocol processor 130 of VCU 16 maybe implemented as a part of transceiver 140.
- Those skilled in the art will appreciate that the particular order of the blocks illustrated in methods 300 and 400 of FIGS. 6 and 7 maybe altered without changing their effect. For example, method 300 as illustrated in FIG. 6 contemplates that one would vary the antenna selection in an interior loop while maintaining the CID constant.

In other embodiments, one might vary the CID selection in an interior loop while maintaining the antenna selection constant.

The description set out above makes reference to particular standards that are in common use in today's networks and in today's video technology. Those skilled in the art will appreciate that these networking and/or video standards are rapidly evolving and that the invention could have application to networking and/or video standards not expressly referred to herein. The invention should not be limited by reference to particular networking or video standards, unless such standards are expressly recited in the claims.

In some embodiments, a particular one of antennas 160 and/or a particular CID may be chosen for communication between VCU 16 and CMS 18 on the basis of ping operation response time without considering RSSI information. Conversely, in some embodiments, a particular one of antennas 160 and/or a particular CID may be chosen for communication between VCU 16 and CMS 18 on the basis of RSSI information without considering ping operation response times.

Those skilled in the art will appreciate that method 400 represents only one method for choosing a preferred combination of CID and antenna and that there are a variety of alternative methods which may be used. For example, where there are multiple valid CID and antenna pairs, it may be possible to sort the CID and antenna pairs according to increasing ping response time and then to start with the CID and antenna pair having the fastest ping response time and conduct a query as to whether the RRSI is greater than the median RSSI or not. If the RSSI is greater than the median RSSI then that CID and antenna pair can be chosen, but if not, then that CID and antenna pair can be discarded and the method will proceed to the next CID and antenna pair on the sorted response time list.

Accordingly, the scope of the invention is to be construed in accordance with the substance defined by the following claims.

What is claimed is:

1. A video monitoring system comprising:
a central monitoring station;
one or more video capture units, each video capture unit wirelessly deployable about a region of interest and each video capture unit comprising:
a camera for capturing video data in at least a portion the region of interest;
a plurality of directional antennas each having antenna gain over an azimuthal angular range;
a RF transceiver;
an antenna selector for selectively connecting the RF transceiver to a particular one of the antennas; and
a controller configured to cause the antenna selector to temporarily connect the RF transceiver to each of the plurality of antennas and, while the RF transceiver is temporarily connected to each individual antenna, to conduct one or more wireless Internet Protocol (IP) ping operations between the video capture unit and the central monitoring station over the connected antenna;
wherein the controller is further configured to choose a selected one of the plurality of antennas based at least in part on response times of the IP ping operations and to cause the antenna selector to connect the RF transceiver to the selected one of the plurality of antennas for subsequent wireless communication of the video data from the video capture unit to the central monitoring station;
wherein wireless communication between the video capture unit and the central monitoring station comprises a frequency hopping spread spectrum modulation; and
wherein the controller is configured with a list comprising a plurality of channel identifiers each channel identifier having an associated frequency hopping sequence and wherein the controller is further configured, while the RF transceiver is temporarily connected to each individual antenna, to conduct one or more wireless Internet Protocol (IP) ping operations between the video capture unit and the central monitoring station over the connected antenna using each of the individual channel identifiers in the list.

2. The system according to claim 1 wherein the controller is configured to choose the antenna having the lowest IP ping response time as the selected one of the plurality of antennas.

3. The system according to claim 1 wherein the controller is further configured to choose a selected channel identifier from among the channel identifiers in the list based at least in part on response times of the IP ping operations and to effect subsequent communication of the video data from the video capture unit to the central monitoring station using the selected channel identifier.

4. The system according to claim 3 wherein the controller is configured to choose the antenna and channel identifier combination associated with the lowest IP ping response time as the selected one of the plurality of antennas and the selected channel identifier.

5. The system according to claim 1 wherein the one or more video capture units each comprise one or more additional sensors comprising at least one of: a motion sensor, a proximity sensor, a chemical sensor and a biological sensor; and wherein information detected by the one or more additional sensors is wirelessly communicated from the one or more video capture units to the central monitoring station.

6. The system according to claim 1 wherein the plurality of antennas comprises a number n antennas and the sector beamwidth of each antenna is greater than or equal to 360°/n.

7. A video monitoring system comprising:
a central monitoring station;
one or more video capture units, each video capture unit wirelessly deployable about a region of interest and each video capture unit comprising:
a camera for capturing video data in at least a portion the region of interest;
a plurality of directional antennas each having antenna gain over an azimuthal angular range;
a RF transceiver;
an antenna selector for selectively connecting the RF transceiver to a particular one of the antennas; and
a controller configured to cause the antenna selector to temporarily connect the RF transceiver to each of the plurality of antennas and, while the RF transceiver is temporarily connected to each individual antenna, to conduct one or more wireless Internet Protocol (IP) ping operations between the video capture unit and the central monitoring station over the connected antenna;
wherein the controller is further configured to choose a selected one of the plurality of antennas based at least in part on response times of the IP ping operations and to cause the antenna selector to connect the RF transceiver to the selected one of the plurality of antennas for subsequent wireless communication of the video data from the video capture unit to the central monitoring station;

wherein the RF transceiver is connected to provide the controller with a received signal strength indication for the received signal corresponding to each IP ping operation; and wherein the controller is configured to choose the selected one of the plurality of antennas based at least in part on both the response times of the IP ping operations and the received signal strength indications for the received signals of the IP ping operations.

8. The system according to claim 7 wherein the controller is configured to choose the selected one of the plurality of antennas by: performing a thresholding process to eliminate antennas having IP ping response times above a threshold level and to obtain one or more valid antennas having IP ping response times below the threshold level; and choosing an antenna associated with the highest received signal strength indication for the received signals of the IP ping operations from among a subset of the one or more valid antennas wherein the subset of the one or more valid antennas have IP ping response times lower than a median of the IP ping response times for the one or more valid antennas.

9. The system according to claim 7 wherein the controller is configured to choose the selected one of the plurality of antennas by: performing a thresholding process to eliminate antennas having IP ping response times above a threshold level and to obtain one or more valid antennas having IP ping response times below the threshold level; and choosing an antenna associated with the lowest IP ping response time from among a subset of the one or more valid antennas wherein the subset of the one or more valid antennas have received signal strength indications for the received signals of the IP ping operations greater than a median of the received signal strength indications for the one or more valid antennas.

10. The system according to claim 7 wherein the one or more video capture units each comprise one or more additional sensors comprising at least one of: a motion sensor, a proximity sensor, a chemical sensor and a biological sensor; and wherein information detected by the one or more additional sensors is wirelessly communicated from the one or more video capture units to the central monitoring station.

11. The system according to claim 7 wherein the plurality of antennas comprises a number n antennas and the sector beamwidth of each antenna is greater than or equal to 360°/n.

12. A video monitoring system comprising:
a central monitoring station;
one or more video capture units, each video capture unit wirelessly deployable about a region of interest and each video capture unit comprising:
a camera for capturing video data in at least a portion the region of interest;
a plurality of directional antennas each having antenna gain over an azimuthal angular range;
a RF transceiver;
an antenna selector for selectively connecting the RF transceiver to a particular one of the antennas; and
a controller configured to cause the antenna selector to temporarily connect the RF transceiver to each of the plurality of antennas and, while the RF transceiver is temporarily connected to each individual antenna, to conduct one or more wireless Internet Protocol (IP) ping operations between the video capture unit and the central monitoring station over the connected antenna;
wherein the controller is further configured to choose a selected one of the plurality of antennas based at least in part on response times of the IP ping operations and to cause the antenna selector to connect the RF transceiver to the selected one of the plurality of antennas for subsequent wireless communication of the video data from the video capture unit to the central monitoring station;
wherein the RF transceiver is connected to provide the controller with a received signal strength indication for the received signal corresponding to each IP ping operation; and
wherein wireless communication between the video capture unit and the central monitoring station comprises frequency hopping spread spectrum modulation.

13. The system according to claim 12 wherein the controller is configured with a list comprising a plurality of channel identifiers each channel identifier having an associated frequency hopping sequence and wherein the controller is further configured, while the RF transceiver is temporarily connected to each individual antenna, to conduct one or more wireless Internet Protocol (IP) ping operations between the video capture unit and the central monitoring station over the connected antenna using each of the individual channel identifiers in the list.

14. The system according to claim 13 wherein the controller is further configured to choose a selected channel identifier from among the channel identifiers in the list based at least in part on both the response times of the IP ping operations and the received signal strength indications for the received signals of the IP ping operations and to effect subsequent communication of the video data from the video capture unit to the central monitoring station using the selected channel identifier.

15. The system according to claim 14 wherein the controller is configured to choose the selected one of the plurality of antennas and the selected channel identifier by: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the highest received signal strength indication for the received signals of the IP ping operations from among a subset of the one or more valid antenna and channel identifier pairs wherein the subset of the one or more valid antenna and channel identifier pairs have IP ping response times lower than a median of the IP ping response times for the one or more valid antenna and channel identifier pairs.

16. The system according to claim 14 wherein the controller is configured to choose the selected one of the plurality of antennas and the selected channel identifier by: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the lowest IP ping response time from among a subset of the one or more valid antenna and channel identifier pairs wherein the subset of the one or more valid antenna and channel identifier pairs have received signal strength indications for the received signals of the IP ping operations greater than a median of the received signal strength indications for the one or more valid antenna and channel identifier pairs.

17. The system according to claim 12 wherein the controller is configured with a list comprising a plurality of channel identifiers each channel identifier having an associated frequency hopping sequence and wherein the controller is further configured to repeat, for each channel identifier, the process of: causing the antenna selector to temporarily connect the RF transceiver to each of the plurality of antennas and, while the RF transceiver is temporarily connected to each individual antenna, conducting one or more wireless Internet Protocol (IP) ping operations between the video capture unit and the central monitoring station over the connected antenna.

18. The system according to claim 17 wherein the controller is further configured to choose a selected channel identifier from among the channel identifiers in the list based at least in part on both the response times of the IP ping operations and the received signal strength indications for the received signals of the IP ping operations and to effect subsequent communication of the video data from the video capture unit to the central monitoring station using the selected channel identifier.

19. The system according to claim 18 wherein the controller is configured to choose the selected one of the plurality of antennas and the selected channel identifier by: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the highest received signal strength indication for the received signals of the IP ping operations from among a subset of the one or more valid antenna and channel identifier pairs wherein the subset of the one or more valid antenna and channel identifier pairs have IP ping response times lower than a median of the IP ping response times for the one or more valid antenna and channel identifier pairs.

20. The system according to claim 18 wherein the controller is configured to choose the selected one of the plurality of antennas and the selected channel identifier by: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the lowest IP ping response time from among a subset of the one or more valid antenna and channel identifier pairs wherein the subset of the one or more valid antenna and channel identifier pairs have received signal strength indications for the received signals of the IP ping operations greater than a median of the received signal strength indications for the one or more valid antenna and channel identifier pairs.

21. The system according to claim 12 wherein the one or more video capture units each comprise one or more additional sensors comprising at least one of: a motion sensor, a proximity sensor, a chemical sensor and a biological sensor; and wherein information detected by the one or more additional sensors is wirelessly communicated from the one or more video capture units to the central monitoring station.

22. The system according to claim 12 wherein the plurality of antennas comprises a number n antennas and the sector beamwidth of each antenna is greater than or equal to 360° /n.

23. A video monitoring system comprising:
a central monitoring station;
one or more video capture units, each video capture unit wirelessly deployable about a region of interest and each video capture unit comprising:
a camera for capturing video data in at least a portion the region of interest;
a plurality of directional antennas each having antenna gain over an azimuthal angular range;
a RF transceiver;
an antenna selector for selectively connecting the RF transceiver to a particular one of the antennas; and
a controller configured to cause the antenna selector to temporarily connect the RF transceiver to each of the plurality of antennas and, while the RF transceiver is temporarily connected to each individual antenna, to conduct one or more wireless Internet Protocol (IP) ping operations between the video capture unit and the central monitoring station over the connected antenna;
wherein the controller is further configured to choose a selected one of the plurality of antennas based at least in part on response times of the IP ping operations and to cause the antenna selector to connect the RF transceiver to the selected one of the plurality of antennas for subsequent wireless communication of the video data from the video capture unit to the central monitoring station;
wherein wireless communication between the video capture unit and the central monitoring station comprises a frequency hopping spread spectrum modulation; and
wherein the controller is configured with a list comprising a plurality of channel identifiers each channel identifier having an associated frequency hopping sequence and wherein the controller is further configured to repeat, for each channel identifier, the process of: causing the antenna selector to temporarily connect the RF transceiver to each of the plurality of antennas and, while the RF transceiver is temporarily connected to each individual antenna, conducting one or more wireless Internet Protocol (IP) ping operations between the video capture unit and the central monitoring station over the connected antenna.

24. The system according to claim 23 wherein the controller is further configured to choose a selected channel identifier from among the channel identifiers in the list based at least in part on response times of the IP ping operations and to effect subsequent communication of the video data from the video capture unit to the central monitoring station using the selected channel identifier.

25. The system according to claim 24 wherein the controller is configured to choose the antenna and channel identifier combination associated with the lowest IP ping response time as the selected one of the plurality of antennas and the selected channel identifier.

26. The system according to claim 23 wherein the one or more video capture units each comprise one or more additional sensors comprising at least one of: a motion sensor, a proximity sensor, a chemical sensor and a biological sensor; and wherein information detected by the one or more additional sensors is wirelessly communicated from the one or more video capture units to the central monitoring station.

27. The system according to claim 23 wherein the plurality of antennas comprises a number n antennas and the sector beamwidth of each antenna is greater than or equal to 360° /n.

28. A method for wirelessly monitoring a region of interest, the method comprising:
providing one or more video capture units, each video capture unit comprising a camera, a plurality of directional antennas each having antenna gain over an azimuthal angular range and a RF transceiver;
deploying the one or more video capture units about the region of interest with the camera of each of the one or more video camera units oriented for capturing video data in at least a portion the region of interest;
providing a central monitoring station at a location spaced apart from the region of interest; and for each of the one or more video capture units:
    temporarily connecting the RF transceiver to each of the plurality of antennas;
    while the RF transceiver is temporarily connected to each of the plurality of antennas, conducting one or more Internet Protocol (IP) ping operations between the video capture unit and the central monitoring station over the connected antenna;
    choosing a selected one of the plurality of antennas based at least in part on the response times of the IP ping operations; and
    connecting the RF transceiver to the selected one of the plurality of antennas for subsequent wireless communication of the video data from the video capture unit to the central monitoring station, wherein wireless communication between the video capture unit and the central monitoring station comprises frequency hopping spread spectrum modulation; and
wherein conducting one or more Internet Protocol (IP) ping operations comprises providing a plurality of channel identifiers each channel identifier having an associated frequency hopping sequence and, while the RF transceiver is temporarily connected to each individual antenna, conducting one or more wireless Internet Protocol (IP) ping operations between the video capture unit and the central monitoring station over the connected antenna using each of the individual channel identifiers in the list.

29. The method according to claim 28 comprising choosing the antenna having the lowest IP ping response time as the selected one of the plurality of antennas.

30. The method according to claim 28 comprising choosing a selected channel identifier from among the channel identifiers in the list based at least in part on response times of the IP ping operations and effecting subsequent communication of the video data from the video capture unit to the central monitoring station using the selected channel identifier.

31. The method according to claim 30 comprising choosing the antenna and channel identifier combination associated with the lowest IP ping response time as the selected one of the plurality of antennas and the selected channel identifier.

32. A method for wirelessly monitoring a region of interest, the method comprising:
    providing one or more video capture units, each video capture unit comprising a camera, a plurality of directional antennas each having antenna gain over an azimuthal angular range and a RF transceiver;
    deploying the one or more video capture units about the region of interest with the camera of each of the one or more video camera units oriented for capturing video data in at least a portion the region of interest;
    providing a central monitoring station at a location spaced apart from the region of interest; and
    for each of the one or more video capture units:
        temporarily connecting the RF transceiver to each of the plurality of antennas;
        while the RF transceiver is temporarily connected to each of the plurality of antennas, conducting one or more Internet Protocol (IP) ping operations between the video capture unit and the central monitoring station over the connected antenna;
        obtaining a received signal strength indication for the received signal corresponding to each IP ping operation;
        choosing a selected one of the plurality of antennas based at least in part on both the response times of the IP ping operations and the received signal strength indications for the received signals of the IP ping operations; and
        connecting the RF transceiver to the selected one of the plurality of antennas for subsequent wireless communication of the video data from the video capture unit to the central monitoring station.

33. The method according to claim 32 wherein choosing the selected one of the plurality of antennas comprises: performing a thresholding process to eliminate antennas having IP ping response times above a threshold level and to obtain one or more valid antennas having IP ping response times below the threshold level; and choosing an antenna associated with the highest received signal strength indication for the received signals of the IP ping operations from among a subset of the one or more valid antennas wherein the subset of the one or more valid antennas have IP ping response times lower than a median of the IP ping response times for the one or more valid antennas.

34. The method according to claim 32 wherein choosing the selected one of the plurality of antennas comprises: performing a thresholding process to eliminate antennas having IP ping, response times above a threshold level and to obtain one or more valid antennas having IP ping response times below the threshold level; and choosing an antenna associated with the lowest IP ping response time from among a subset of the one or more valid antennas wherein the subset of the one or more valid antennas have received signal strength indications for the received signals of the IP ping operations greater than a median of the received signal strength indications for the one or more valid antennas.

35. A method for wirelessly monitoring a region of interest, the method comprising:
    providing one or more video capture units, each video capture unit comprising a camera, a plurality of directional antennas each having antenna gain over an azimuthal angular range and a RF transceiver;
    deploying the one or more video capture units about the region of interest with the camera of each of the one or more video camera units oriented for capturing video data in at least a portion the region of interest;
    providing a central monitoring station at a location spaced apart from the region of interest; and
    for each of the one or more video capture units:
        temporarily connecting the RF transceiver to each of the plurality of antennas;
        while the RF transceiver is temporarily connected to each of the plurality of antennas, conducting one or more Internet Protocol (IP) ping operations between the video capture unit and the central monitoring station over the connected antenna;
        choosing a selected one of the plurality of antennas based at least in part on the response times of the IP ping operations;
        obtaining a received signal strength indication for the received signal corresponding to each IP ping operation; and
        connecting the RF transceiver to the selected one of the plurality of antennas for subsequent wireless communication of the video data from the video capture unit to the central monitoring station, wherein wireless communication between the video capture unit and the central monitoring station comprises frequency hopping spread spectrum modulation.

36. The method according to claim 35 comprising providing a list comprising a plurality of channel identifiers each channel identifier having an associated frequency hopping sequence and, while the RF transceiver is temporarily connected to each individual antenna, conducting one or more wireless Internet Protocol (IP) ping operations between the video capture unit and the central monitoring station over the connected antenna using each of the individual channel identifiers in the list.

37. The method according to claim 36 comprising choosing a selected channel identifier from among the channel identifiers in the list based at least in part on both the response times of the IP ping operations and the received signal strength indications for the received signals of the IP ping operations and effecting subsequent communication of the video data from the video capture unit to the central monitoring station using the selected channel identifier.

38. The method according to claim 37 wherein choosing the selected one of the plurality of antennas and choosing the selected channel identifier comprise: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the highest received signal strength indication for the received signals of the IP ping operations from among a subset of the one or more valid antenna and channel identifier pairs wherein the subset of the one or more valid antenna and channel identifier pairs have IP ping response times lower than a median of the IP ping response times for the one or more valid antenna and channel identifier pairs.

39. The method according to claim 37 wherein choosing the selected one of the plurality of antennas and choosing the selected channel identifier comprises: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the lowest IP ping response time from among a subset of the one or more valid antenna and channel identifier pairs wherein the subset of the one or more valid antenna and channel identifier pairs have received signal strength indications for the received signals of the IP ping operations greater than a median of the received signal strength indications for the one or more valid antenna and channel identifier pairs.

40. The method according to claim 35 comprising providing a list comprising a plurality of channel identifiers each channel identifier having an associated frequency hopping sequence and repeating, for each channel identifier, the process of: temporarily connecting the RF transceiver to each of the plurality of antennas and, while the RF transceiver is temporarily connected to each of the plurality of antennas, conducting one or more Internet Protocol (IP) ping operations between the video capture unit and the central monitoring station over the connected antenna.

41. The method according to claim 40 comprising choosing a selected channel identifier from among the channel identifiers in the list based at least in part on both the response times of the IP ping operations and the received signal strength indications for the received signals of the IP ping operations and effecting subsequent communication of the video data from the video capture unit to the central monitoring station using the selected channel identifier.

42. The method according to claim 41 wherein choosing the selected one of the plurality of antennas and choosing the selected channel identifier comprise: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the highest received signal strength indication for the received signals of the IP ping operations from among a subset of the one or more valid antenna and channel identifier pairs wherein the subset of the one or more valid antenna and channel identifier pairs have IP ping response times lower than a median of the IP ping response times for the one or more valid antenna and channel identifier pairs.

43. The method according to claim 41 wherein choosing the selected one of the plurality of antennas and choosing the selected channel identifier comprise: performing a thresholding process to eliminate antenna and channel identifier pairs having IP ping response times above a threshold level and to obtain one or more valid antenna and channel identifier pairs having IP ping response times below the threshold level; and choosing an antenna and channel identifier pair associated with the lowest IP ping response time from among a subset of the one or more valid antenna and channel identifier pairs wherein the subset of the one or more valid antenna and channel identifier pairs have received signal strength indications for the received signals of the IP ping operations greater than a median of the received signal strength indications for the one or more valid antenna and channel identifier pairs.

44. A method for wirelessly monitoring a region of interest, the method comprising:
providing one or more video capture units, each video capture unit comprising a camera, a plurality of directional antennas each having antenna gain over an azimuthal angular range and a RF transceiver;
deploying the one or more video capture units about the region of interest with the camera of each of the one or more video camera units oriented for capturing video data in at least a portion the region of interest;
providing a central monitoring station at a location spaced apart from the region of interest; and
for each of the one or more video capture units:
temporarily connecting the RF transceiver to each of the plurality of antennas;
while the RF transceiver is temporarily connected to each of the plurality of antennas, conducting one or more Internet Protocol (IP) ping operations between the video capture unit and the central monitoring station over the connected antenna;
choosing a selected one of the plurality of antennas based at least in part on the response times of the IP ping operations; and
connecting the RF transceiver to the selected one of the plurality of antennas for subsequent wireless communication of the video data from the video capture unit to the central monitoring station, wherein wireless communication between the video capture unit and the central monitoring station comprises frequency hopping spread spectrum modulation; and
wherein conducting one or more Internet Protocol (IP) ping operations comprises providing a list comprising a plurality of channel identifiers each channel identifier having an associated frequency hopping sequence and repeating, for each channel identifier, the process of: temporarily connecting the RF transceiver to each of the plurality of antennas and, while the RF transceiver is temporarily connected to each of the plurality of antennas, conducting one or more Internet Protocol (IP) ping operations between the video capture unit and the central monitoring station over the connected antenna.

45. The method according to claim 44 comprising choosing a selected channel identifier from among the channel identifiers in the list based at least in part on response times of the IP ping operations and effecting subsequent communication of the video data from the video capture unit to the central monitoring station using the selected channel identifier.

46. The method according to claim 45 comprising choosing the antenna and channel identifier combination associated with the lowest IP ping response time as the selected one of the plurality of antennas and the selected channel identifier.

* * * * *